United States Patent
Xu et al.

(10) Patent No.: US 12,304,006 B2
(45) Date of Patent: May 20, 2025

(54) SIMPLIFIED METHOD FOR WELDING 5G POSITION FILLER LAYER OF MARINE RISER AND PRODUCT THEREOF

(71) Applicant: Tianjin University, Tianjin (CN)

(72) Inventors: Lianyong Xu, Tianjin (CN); Kangda Hao, Tianjin (CN); Yongdian Han, Tianjin (CN); Lei Zhao, Tianjin (CN); Wenjing Ren, Tianjin (CN); Hongyang Jing, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 18/671,997

(22) Filed: May 23, 2024

(65) Prior Publication Data

US 2024/0391031 A1 Nov. 28, 2024

(30) Foreign Application Priority Data

May 25, 2023 (CN) .......................... 202310614610.X

(51) Int. Cl.
*B23K 28/02* (2014.01)
*B23K 9/173* (2006.01)
(Continued)

(52) U.S. Cl.
CPC .............. *B23K 28/02* (2013.01); *B23K 9/173* (2013.01); *B23K 26/082* (2015.10); *B23K 2101/10* (2018.08)

(58) Field of Classification Search
CPC .... B23K 28/02; B23K 9/173; B23K 2101/10; B23K 26/082
See application file for complete search history.

(56) References Cited

U.S. PATENT DOCUMENTS

| | | | |
|---|---|---|---|
| 9,440,314 B2 * | 9/2016 | Devers | B23K 26/348 |
| 2012/0187096 A1 * | 7/2012 | Schmid | B23K 26/348 219/121.64 |

(Continued)

FOREIGN PATENT DOCUMENTS

| | | |
|---|---|---|
| CN | 101716701 | 6/2010 |
| CN | 102371418 | 3/2012 |

(Continued)

OTHER PUBLICATIONS

"Search Report of China Counterpart Application", issued on Feb. 9, 2024, pp. 1-2.

*Primary Examiner* — Brian W Jennison
(74) *Attorney, Agent, or Firm* — JCIPRNET

(57) ABSTRACT

A simplified method for welding a 5G position filler layer of a marine riser and a product thereof are provided, and the disclosure belongs to the technical field of welding. The method specifically includes the following. performing filler welding on the marine riser using an oscillation scanning laser-GMAW hybrid welding process; performing welding on each layer using same process parameters, then reducing gravity of a molten pool and increasing an arc force through interaction between laser and an arc, meanwhile expanding a range of a welding molten pool through an oscillation scanning behavior of the laser beam. A lack-of-fusion defect is prevented from being generated. A 5G position filler layer welding process of the marine riser is effectively simplified in the disclosure. Further, laser beam scanning also expands the range of the welding molten pool and prevents generation of the lack-of-fusion defect on a side wall.

8 Claims, 2 Drawing Sheets

(51) Int. Cl.
*B23K 26/082* (2014.01)
*B23K 101/10* (2006.01)

(56) References Cited

U.S. PATENT DOCUMENTS

2013/0292362 A1* 11/2013 Fairchild ................ B23K 9/173
　　　　　　　　　　　　　　　　　　　　　　　219/146.1
2021/0016379 A1* 1/2021 Qu ......................... B23K 9/167

FOREIGN PATENT DOCUMENTS

| CN | 102825400 | 12/2012 |
| CN | 103056533 | 4/2013 |
| CN | 113847368 | 12/2021 |
| CN | 113927133 | 1/2022 |

\* cited by examiner

SIMPLIFIED METHOD FOR WELDING 5G POSITION FILLER LAYER OF MARINE RISER AND PRODUCT THEREOF

CROSS-REFERENCE TO RELATED APPLICATION

This application claims the priority benefit of China application serial no. 202310614610.X, filed on May 25, 2023. The entirety of the above-mentioned patent application is hereby incorporated by reference herein and made a part of this specification.

BACKGROUND

Technical Field

The disclosure belongs to the technical field of welding, and more specifically, relates to a simplified method for welding a 5G position filler layer of a marine riser and a product thereof.

Description of Related Art

Risers are one of the key equipment in deepwater development and are mainly used to connect surface floating bodies and subsea wellheads and transport oil and gas resources. Since their first application in the Gulf of Mexico in 1994, steel catenary risers have gradually become the preferred riser form for deepwater development due to advantages such as lower costs, greater adaptability to floating body movement, and suitability for high-temperature and high-pressure working environments.

At present, the fully automatic welding systems equipped on the operation lines of China's major marine riser pipe-laying vessels HYSY201, HYSY202, and Lanjiang are all Sturnax 05 systems manufactured by SERIMAX. The GMAW (gas metal arc welding) method is used to fill the grooves, and process parameter partition control is adopted for different welding angles, so there is a problem of heavy workload in the parameter exploration process. Further, the core welding technology has been kept secret, so the manufacturer's welding technology support thus become critical.

SUMMARY

In view of the defects found in the related art, the disclosure aims to provide a simplified method for welding a 5G position filler layer of a marine riser and a product thereof, so as to solve the problems found in the existing marine risers.

To achieve the above, according to one aspect of the disclosure, a simplified method for welding a 5G position filler layer of a marine riser is provided. The method specifically includes the following. Filler welding is performed on the marine riser using an oscillation scanning laser-GMAW hybrid welding process. Welding is performed on each layer using same process parameters, and gravity of a molten pool is reduced and an arc force is increased through interaction between laser and an arc. A range of a welding molten pool is expanded through an oscillation scanning behavior of a laser beam, and a lack-of-fusion defect is prevented from being generated.

Further preferably, laser power in the oscillation scanning laser-GMAW hybrid welding process is 1 kW to 2 kW.

Further preferably, a welding current in the oscillation scanning laser-GMAW hybrid welding process is 180 A to 230 A.

Further preferably, a welding speed in the oscillation scanning laser-GMAW hybrid welding process is 500 mm/min to 800 mm/min.

Further preferably, a robot or a rail car is adopted to achieve fully automatic welding.

Further preferably, a size of the marine riser ranges from 6 inches to 18 inches.

Further preferably, a wall thickness of the marine riser is 19 mm to 32 mm.

Further preferably, a groove form of the marine riser is U-shaped.

According to another aspect of the disclosure, a marine riser prepared by the above method is provided.

To sum up, the above technical solutions provided by the disclosure have the following beneficial effects compared with the related art.

1. In the disclosure, the oscillation scanning laser-GMAW hybrid welding process is used to replace the conventional GMAW process. There is no need to match different welding process parameters through angle partitions, and welding can be completed using the same parameters for each layer. The 5G position filler layer welding process of the marine riser is effectively simplified. Further, the energy density is increased through the interaction between the laser and the arc, so the gravity of the molten pool is reduced and the arc force is increased, and arc stability and the molten pool metal filling effect are ensured under different welding postures. At the same time, laser beam scanning also expands the range of the welding molten pool and prevents generation of the lack-of-fusion defect on the side wall.

2. In particular, by optimizing the laser power in the disclosure, problems such as a larger penetration depth of the welded seam or burn-through and deformation of the welding material are prevented from being generated. Further, through the matching of the laser power and the welding speed, the problem of insufficient welding penetration caused by smaller deposited metal due to a smaller penetration depth of the welded seam is also prevented.

3. The marine riser provided by the disclosure is made by using the oscillation scanning laser-GMAW hybrid welding process. The weld is formed in a favorable manner, the lack-of-fusion defect does not occur, and the grain size of the welded seam is refined, so a wider range of application scenarios are provided.

DESCRIPTION OF THE EMBODIMENTS

Figure 1:
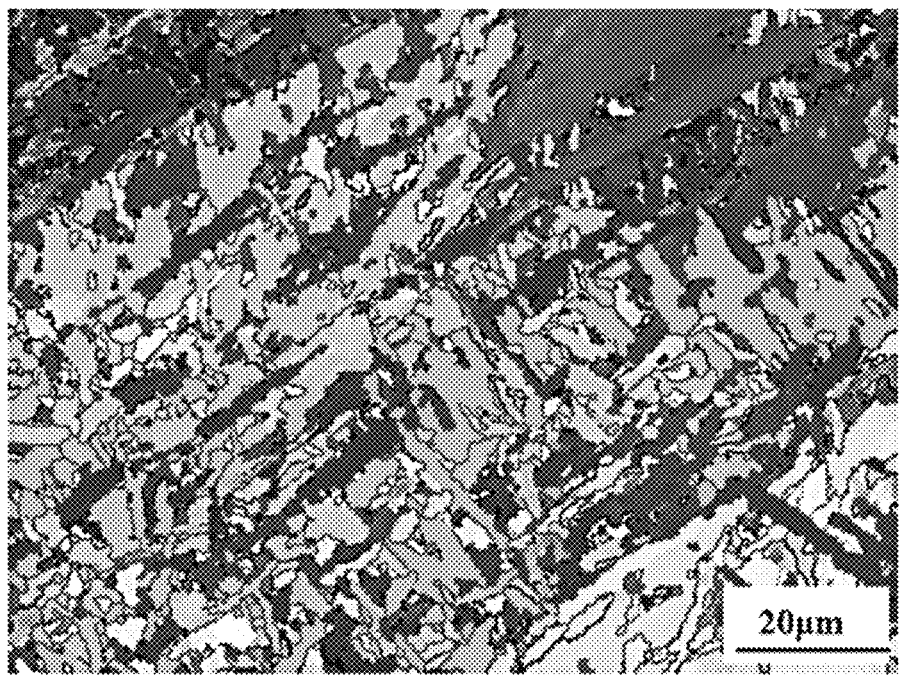
FIG. 1 is a metallographic picture of a marine riser prepared according to Example 1 of the disclosure.

In order to make the objectives, technical solutions, and advantages of the disclosure clearer and more comprehensible, the disclosure is further described in detail with reference to the drawings and embodiments. It should be understood that the specific embodiments described herein serve to explain the disclosure merely and are not used to limit the disclosure.

According to one aspect of the disclosure, a simplified method for welding a 5G position filler layer of a marine riser is provided. The method specifically includes the following. Filler welding is performed on the marine riser using an oscillation scanning laser-GMAW hybrid welding process. Energy density is increased through interaction between laser and an arc, so gravity of a molten pool is reduced and an arc force is increased, an arc stability and molten pool metal spreading are thus improved. Meanwhile a range of a welding molten pool may be expanded through an oscillation scanning behavior of the laser beam, so that a lack-of-fusion defect is prevented from being generated. There is no need to establish filler welding process parameters in different partitions, and each layer is welded using the same process parameters. A 5G position filler layer welding process of the marine riser is thus simplified. The welding process is stable, and an obtained welded joint exhibits favorable appearance and shows no lack-of-fusion defect.

In the disclosure, in view of the welding process of the marine riser, the oscillation scanning laser-GWAW hybrid welding process is creatively used to replace the conventional GWAW arc welding process, and a U-shaped groove of the marine riser is filled. Further, in the disclosure, a laser scanning behavior is introduced into ordinary laser-GWAW hybrid welding, so that laser energy acts on a side wall of a welded seam groove. In this way, the range of the welding molten pool may be expanded and the lack-of-fusion defect is prevented from being generated on the side wall. The molten pool is affected by a series of complex forces such as gravity, surface tension, and arc blowing force, so the arc exhibits different weldability at different welding positions. Herein, surface tension and arc blowing force are forces that hinder the downward flow of the molten pool and are able to support the molten pool, and the arc blowing force, in particular can cause molten pool metal to flow laterally from the center to both sides. However, when the arc is in an overhead welding position, gravity has the greatest influence on formation of a welded seam. At this time, a speed of the molten pool metal flowing downward is accelerated, especially when the molten pool metal flows to the front of the arc, the arc is disturbed and arc stability is thus reduced. In the disclosure, the energy density of the arc may be increased through the interaction between laser and arc, and a volume of the formed molten pool is smaller. The gravity of the molten pool is reduced and the arc force is increased at the same time, so the arc stability is ensured under different welding postures. Further, as a heat source with high energy density, the addition of laser is able to increase a temperature gradient of the molten pool and accelerate the metal flow rate of the molten pool. The molten pool metal may thus be spread laterally in a shorter solidification time, and generation of the lack-of-fusion defect may be prevented to a certain extent. More importantly, the oscillatory scanning behavior of the laser beam may cause the laser energy to act on the side wall of the weld seam groove through the periodic swing of the laser beam. The flow state of the molten pool is regulated, the range of the welding molten pool is expanded, and the lack-of-fusion defect is prevented from being generated on the side wall. Further, laser beam scanning may enhance a stirring effect on the molten pool and promote non-spontaneous nucleation of the molten pool, so effects of refining grains and improving joint performance are achieved.

Further, the method for determining the process parameters of each layer is as follows. First, a same material is welded in a flat plate state, and the welding parameters with a good welding shape in the flat plate state were obtained. Each layer of the marine riser is then subjected to a welding test, and fine adjustments are made up and down based on the welding parameters in the flat plate state. The welding parameters in which the welded seam of each layer is well formed, has no obvious defects, and is completely filled, and then the process parameters of each layer are determined.

Further, in the oscillation scanning laser-GMAW hybrid welding process, laser power is 1 kW to 2 kW, so that problems such as a larger penetration depth of the welded seam or burn-through and deformation of the welding material are prevented from being generated. A welding current is 180 A to 230 A, and a welding speed is 500 mm/min to 800 mm/min. When the laser power is increased, the welding speed also needs to be increased. Through the matching of the laser power and the welding speed, the problem of insufficient welding penetration caused by smaller deposited metal due to a smaller penetration depth of the welded seam is prevented.

Further, in the disclosure, a robot may be used to achieve fully automatic welding of the marine riser in the 5G position, or a rail car may also be used to achieve fully automatic welding of the marine riser in the 5G position.

Further, a size of the marine riser ranges from 6 inches to 18 inches, a wall thickness is 19 mm to 32 mm, and a groove form is U-shaped. The U-shaped groove has less cladding metal, so that welding deformation may be effectively lowered. The welding method is 5G position welding.

According to another aspect of the disclosure, a marine riser prepared by the above method is provided.

The technical solutions provided by the disclosure are further described in detail according to the following specific examples.

Example 1

In this example, the material to be welded is a marine riser with a size of 12 inches and a material of X65, and the filler layer welding process used is oscillation scanning laser-GMAW hybrid welding. Herein, the parameters of the filler layer welding process are laser power 1.5 kW, welding current 210A, welding voltage 22V, and welding speed 600 mm/min. Further, laser beam circular scanning is introduced based on the above. The scanning radius of the laser beam used in the filler layer is 1 mm to 3.5 mm, and the scanning frequency is 50 Hz. During the welding process, the arc is stable, the weld is formed in a favorable manner, the lack-of-fusion defect does not occur, and the grain size of the welded seam is refined, as shown in FIG. 1.

Comparative Example 1

Figure 2:
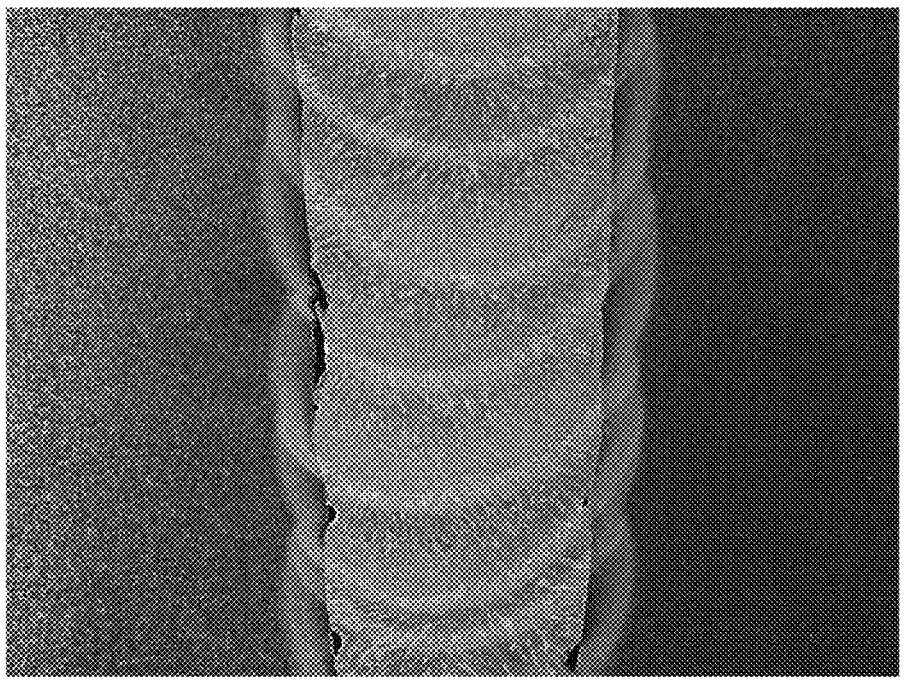
FIG. 2 is a morphological view of a marine riser prepared according to Comparative Example 1 of the disclosure.

The material to be welded in this example is the same as that in Example 1, the filler layer welding process used is GMAW welding, and the welding process parameters are controlled by partitions. The welding current is 210 A, the welding voltage is 22V, and the welding speed is 420 mm/min for 0° to 120°, and the welding current is 210 A, the welding voltage is 21V, and the welding speed is 360 mm/min for 120° to 180°. When the welding reaches 120°, the welding arc begins to diverge and drift, the arc directivity is poor, and a large number of lack-of-fusion defects are generated, as shown in FIG. 2.

Comparative Example 2

Figure 3:
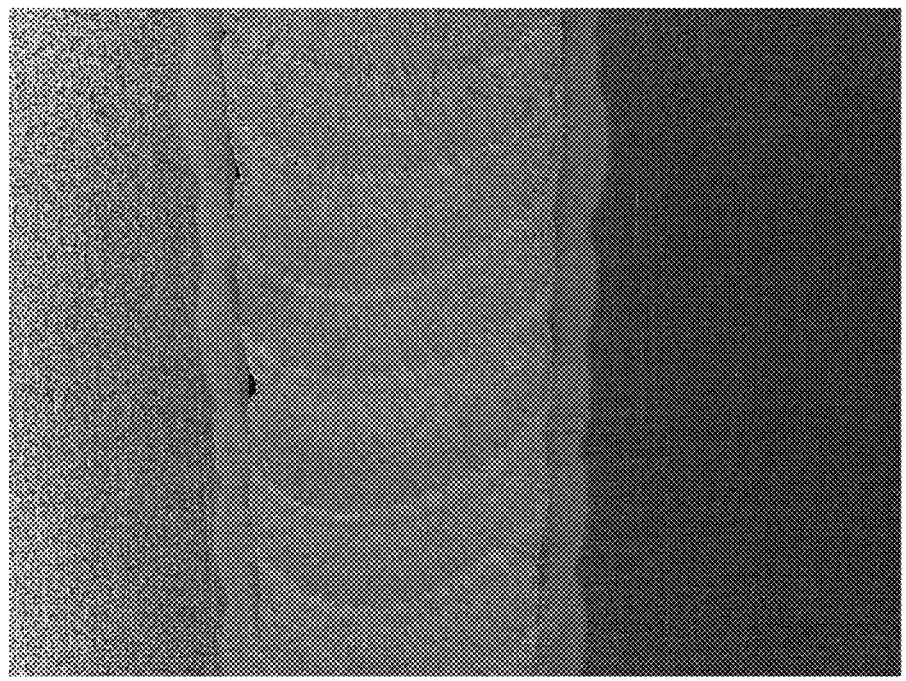
FIG. 3 is a morphological view of a marine riser prepared according to Comparative Example 2 of the disclosure.
Figure 4:
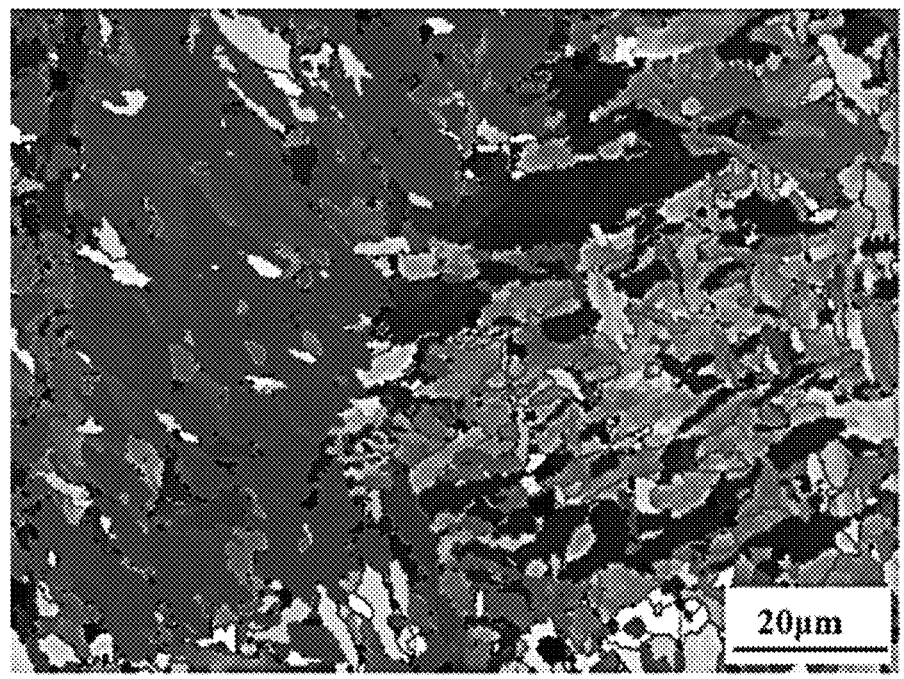
FIG. 4 is a metallographic picture of a marine riser prepared according to Comparative Example 2 of the disclosure.

The material to be welded in this example is the same as that in Example 1, the filler layer welding process used is laser-GMAW hybrid welding, and the welding process parameters are not controlled by partitions. The parameters of the filler layer welding process are the same as those in Example 1, but unlike Example 1, circular scanning of the laser beam is not introduced in Comparative Example 1. The welding process is stable and there is no arc drift, but there are still a few lack-of-fusion defects in the cross section, as shown in FIG. 3 and FIG. 4.

A person having ordinary skill in the art should be able to easily understand that the above description is only preferred embodiments of the disclosure and is not intended to limit the disclosure. Any modifications, equivalent replacements, and modifications made without departing from the spirit and principles of the disclosure should fall within the protection scope of the disclosure.

What is claimed is:
1. A simplified method for welding a plurality of 5G position filler layers of a marine riser, comprising:
    performing 5G position filler welding on the marine riser to form a plurality of filler layers using an oscillation scanning laser-GMAW hybrid welding process;
    a laser beam introduced by the oscillation scanning laser-GMAW hybrid welding process in a circular scanning manner;
    wherein, welding parameters of the oscillation scanning laser-GMAW hybrid welding process comprise: a power of the laser beam in the oscillation scanning laser-GMAW hybrid welding process is 1 kW to 2 kW, a welding speed in the oscillation scanning laser-GMAW hybrid welding process is 500 mm/min to 800 mm/min, and a scanning radius of the laser beam is 1 mm to 3.5 mm,
    wherein the welding parameters are the same for each of the plurality of filler layers;
    forming a welding molten pool and increasing an arc force through interaction between laser beam and the arc by the laser beam acting on a groove of the marine riser; and
    expanding a range of the welding molten pool through an oscillation scanning behavior of the laser beam.

2. The simplified method for welding a plurality of 5G position filler layers of the marine riser according to claim 1, further comprising wherein adjusting a welding current, wherein the welding current in the oscillation scanning laser-GMAW (gas metal arc welding) hybrid welding process is 180 A to 230 A.

3. The simplified method for welding a plurality of 5G position filler layers of the marine riser according to claim 1, wherein a size of the marine riser ranges from 6 inches to 18 inches.

4. The simplified method for welding a plurality of 5G position filler layers of the marine riser according to claim 1, wherein a wall thickness of the marine riser is 19 mm to 32 mm.

5. The simplified method for welding a plurality of 5G position filler layers of the marine riser according to claim 1, wherein the groove form of the marine riser is U-shaped.

6. The simplified method for welding a plurality of 5G position filler layers of the marine riser according to claim 2, wherein the groove form of the marine riser is U-shaped.

7. The simplified method for welding a plurality of 5G position filler layers of the marine riser according to claim 4, wherein the groove form of the marine riser is U-shaped.

8. The simplified method for welding a plurality of 5G position filler layers of the marine riser according to claim 5, wherein the groove form of the marine riser is U-shaped.

* * * * *